(12) United States Patent
Tsuchiya et al.

(10) Patent No.: US 8,038,487 B2
(45) Date of Patent: Oct. 18, 2011

(54) ELECTRODE STRUCTURE

(75) Inventors: Takenori Tsuchiya, Toyota (JP); Hiroki Nagai, Nagoya (JP); Masahide Hikosaka, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/996,093

(22) PCT Filed: May 13, 2009

(86) PCT No.: PCT/JP2009/058897
§ 371 (c)(1),
(2), (4) Date: Dec. 3, 2010

(87) PCT Pub. No.: WO2009/150917
PCT Pub. Date: Dec. 17, 2009

(65) Prior Publication Data
US 2011/0092111 A1    Apr. 21, 2011

(30) Foreign Application Priority Data

Jun. 13, 2008 (JP) .................. 2008-155169

(51) Int. Cl.
*H01R 4/38* (2006.01)
(52) U.S. Cl. .......... 439/765; 439/627; 429/160
(58) Field of Classification Search .......... 439/765, 439/507, 510, 627; 429/90, 96, 160; 361/328
See application file for complete search history.

(56) References Cited

U.S. PATENT DOCUMENTS

| 5,985,480 | A * | 11/1999 | Sato et al. ............... 429/65 |
| 7,077,704 | B2 * | 7/2006 | Ikeda et al. ............. 439/627 |
| 7,736,796 | B2 * | 6/2010 | Nagatani et al. ........ 429/158 |
| 7,935,438 | B2 * | 5/2011 | Kim ........................ 429/160 |
| 2006/0105624 | A1 | 5/2006 | Yoshikane et al. |

FOREIGN PATENT DOCUMENTS

| JP | 63-22064 | 2/1988 |
| JP | 2002-42753 | 2/2002 |
| JP | 2002-190289 | 7/2002 |
| JP | 2006-48996 | 2/2006 |

(Continued)

OTHER PUBLICATIONS

International Search Report in International Application No. PCT/JP2009/058897; Mailing Date: Aug. 18, 2009.

(Continued)

*Primary Examiner* — Tulsidas C Patel
*Assistant Examiner* — Travis Chambers
(74) *Attorney, Agent, or Firm* — Finnegan, Henderson, Farabow, Garrett & Dunner, LLP (57) ABSTRACT

An electrode structure for connecting a battery module to a bus bar is provided. An electrode structure including a metal terminal having a base and a tip end, the base fixed to a body of a battery module, the tip end spaced apart by a predetermined distance from the body of the battery module and connected to a bus bar, a nut arranged between the tip end of the metal terminal and the body of the battery module, a rotation stopper in abutment with the nut and preventing the nut from slipping when fastening the bus bar, and a screw shaft screwed into the nut and penetrating through the tip end of the metal terminal and the bus bar.

11 Claims, 7 Drawing Sheets

FOREIGN PATENT DOCUMENTS

| | | |
|---|---|---|
| JP | 2006-147319 | 6/2006 |
| JP | 2007-48600 | 2/2007 |

OTHER PUBLICATIONS

"Notice of Grounds of Rejection" in Japanese Application No. 2008-155169; Mailing Date: Aug. 18, 2009.

"Decision to Grant Patent" in Japanese Application No. 2008-155169; Mailing Date: Jun. 1, 2010.

Written Opinion of the International Searching Authority in International Application No. PCT/JP2009/058897; Completion Date: Aug. 18, 2009.

Written Opinion of the International Preliminary Examining Authority in International Application No. PCT/JP2009/058897; Mailing Date: Mar. 23, 2010.

International Preliminary Report on Patentability in International Application No. PCT/JP2009/058897; Completion Date: Jun. 3, 2010.

* cited by examiner

ELECTRODE STRUCTURE

CROSS-REFERENCE TO RELATED APPLICATIONS

This application is a national phase application of International Application No. PCT/JP2009/058897, filed May 13, 2009, and claims the priority of Japanese Application No. 2008-155169, filed Jun. 13, 2008, the contents of both of which are incorporated herein by reference.

TECHNICAL FIELD

The present invention relates to an electrode structure and, more specifically, to an electrode structure for connecting a battery module to a bus bar.

BACKGROUND ART

A battery device mounted on a hybrid vehicle or an electric vehicle has a plurality of battery modules connected in series or in parallel. The plurality of battery modules are connected to each other by a bus bar. The battery module is provided with an electrode to be connected to the bus bar.

For the connection to the bus bar, a bolt and a nut are attached to a metal terminal of the electrode. The bolt attached to the metal terminal penetrates through the bus bar and is screwed into the nut, so that the bus bar is firmly fixed.

Figure 11:
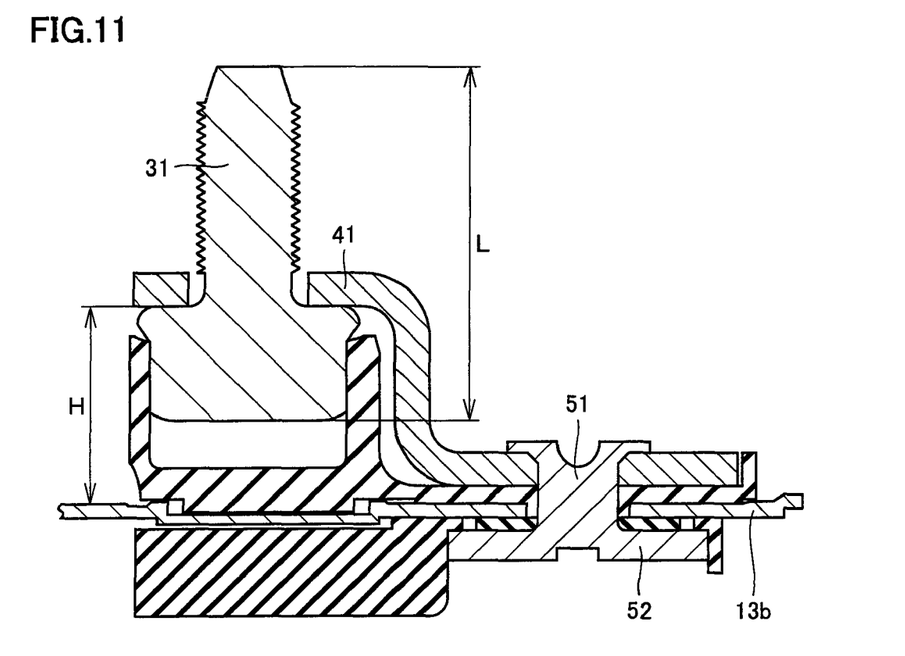
FIG. 11 is a sectional view of a structure of an electrode, for illustration of problems to be solved by the invention of the present application.

Considering the process step of attaching the bus bar to the electrode, it may be possible to temporarily fix the bolt penetrating through the metal terminal, in advance to the metal terminal. As a method of such temporary fixing of the bolt, it may be possible to pass the bolt in advance through a through hole provided in the metal terminal, and to temporarily support the bolt from below with a temporary supporting member. FIG. 11 shows one example of this method. FIG. 11 is prepared for illustration of the problems to be solved by the invention of the present application.

A structure of a battery module is disclosed in Patent Document 1 (Japanese Patent Laying-Open No. 2006-48996) and Patent Document 2 (Japanese Patent Laying-Open No. 2002-42753).

PRIOR ART DOCUMENTS

Patent Documents

Patent Document 1: Japanese Patent Laying-Open No. 2006-48996
Patent Document 2: Japanese Patent Laying-Open No. 2002-42753

SUMMARY OF THE INVENTION

Problems to be Solved by the Invention

In an electrode structure as shown in FIG. 11, when a clearance H between a metal terminal 41 and a lid 13b of a body of a battery module is narrow, a bolt 31 cannot be attached after fixing of metal terminal 41. That is, bolt 31 cannot be inserted afterwards unless there is a gap located between metal terminal 41 and lid 13b and approximately corresponding to a total length L of the bolt made up of a shaft and a head of the bolt.

For that reason, the following process steps are required. Metal terminal 41 is in advance penetrated through by bolt 31. Metal terminal 41 penetrated through by bolt 31 is fixed to lid 13b with a rivet 51. Lid 13b attached with metal terminal 41 penetrated through by bolt 31, is attached to a body of a battery module.

According to such process steps, since bolt 31 penetrates in advance through metal terminal 41, friction between metal terminal 41 and bolt 31 may generate metal powder. Intrusion of this metal powder into a body of a battery module can cause a product failure of the battery module.

In order to avoid such a product failure, it is necessary to thoroughly clean parts positioned inside the body of the battery module to remove metal powder when a body of a battery module is assembled. This causes a problem of increased process steps.

Accordingly, the present invention was made to solve the above-described problems, and its object is to provide an electrode structure in which parts to be attached in advance to a metal terminal of an electrode are reduced so that generation of metal powder can be reduced.

Means for Solving the Problems

The present invention provides an electrode structure for connecting a battery module to a bus bar. The electrode structure includes a metal terminal having a base and a tip end, the base fixed to a body of the battery module, the tip end spaced apart by a predetermined distance from the body of the battery module and connected to the bus bar, a nut arranged between the tip end of the metal terminal and the body of the battery module, a rotation stopper in abutment with the nut and preventing the nut from slipping when fastening the bus bar, and a screw shaft screwed into the nut and penetrating through the tip end of the metal terminal and the bus bar.

The electrode structure described above may further include an insulator arranged between the base of the metal terminal and the body of the battery module and an engaging member in engagement with a periphery of the nut. The engaging member has one of a key and a slot extending in a direction of insertion of the nut between the tip end of the metal terminal and the insulator, the insulator has the other of a key and a slot to be engaged with the key or slot of the engaging member, and the insulator and the engaging member in engagement with the nut are engaged together by the key and slot to form the rotation stopper.

In the electrode structure described above, the nut has one of a key and a slot extending in a direction of insertion of the nut between the tip end of the metal terminal and the insulator, the insulator has the other of a key and a slot to be engaged with the key or slot of the nut, and the insulator and the nut may be engaged together by the key and slot to form the rotation stopper.

In the electrode structure described above, the insulator may have a wall portion rising up to laterally enclose the nut.

In the electrode structure described above, the screw shaft may be formed of a bolt in which a bolt head and a screw shaft portion are integrally formed.

In the electrode structure described above, the screw shaft may be formed of a headless setscrew penetrating through the tip end of the metal terminal and the bus bar and screwed into the nut, and a fixing nut for fastening the tip end of the metal terminal and the bus bar together may be screwed into a tip end of the headless setscrew.

Effects of the Invention

According to the electrode structure of the present invention, reduction of parts to be attached in advance to a metal

MODES FOR CARRYING OUT THE INVENTION

In the following, the electrode structure in accordance with various embodiments of the present invention will be described with reference to the figures. In these embodiments, the same or corresponding portions are denoted by the same reference characters, and accumulative description will not be repeated.

Embodiment 1

Figure 1:
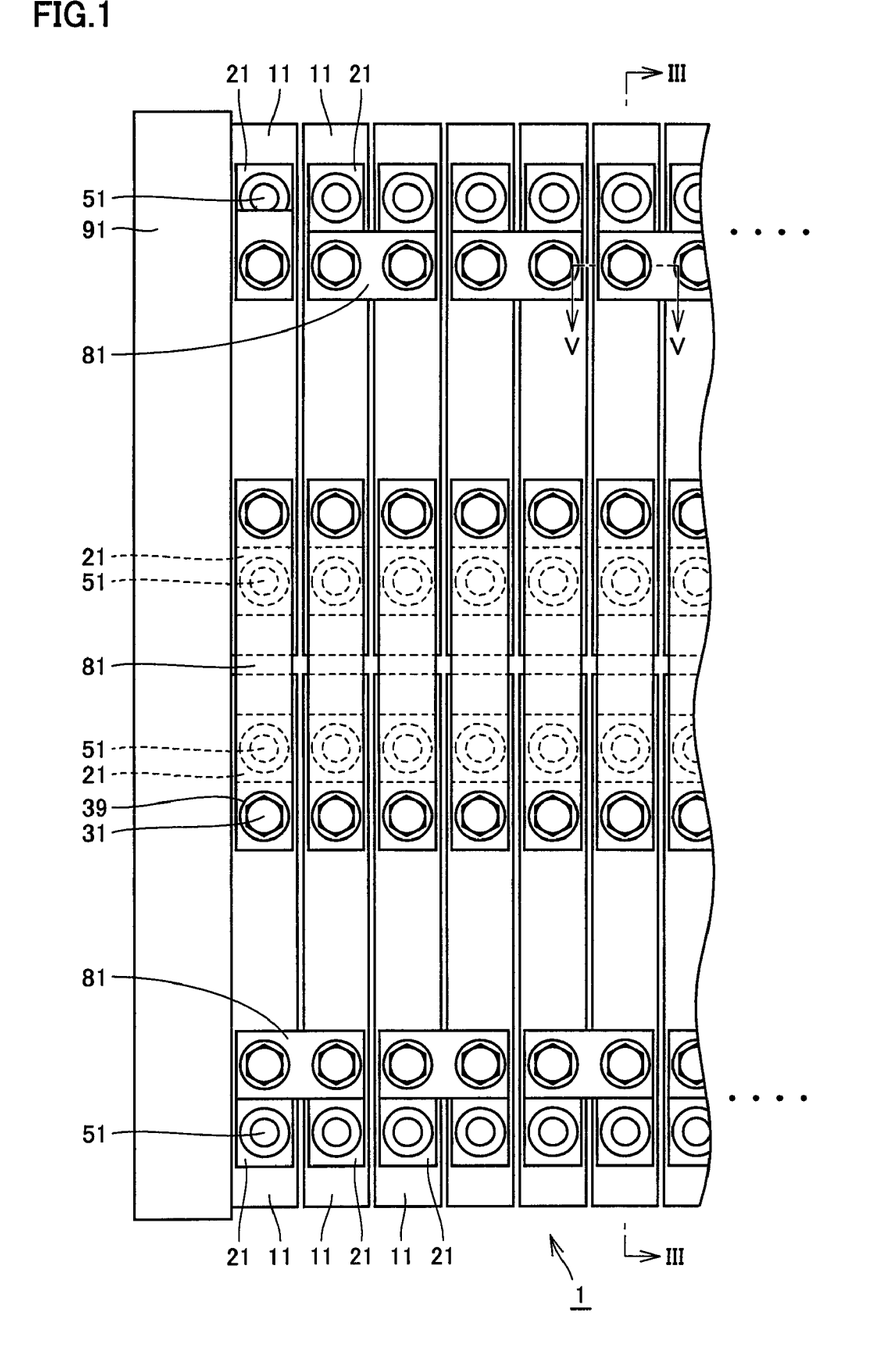
FIG. 1 is a plan view showing a structure of a battery device in accordance with Embodiment 1 of the present invention.

FIG. 1 is a plan view showing a structure of a battery device in accordance with the present embodiment. As shown in FIG. 1, a battery device 1 has a plurality of battery modules 11. In battery device 1 shown in FIG. 1, battery modules 11 are arranged in two rows with their main surfaces positioned parallel to each other. Though an example in which battery modules 11 are arranged in two rows is shown here, the modules may be arranged in one row or in three or more rows.

Each battery module 11 has electrodes 21 serving as positive and negative electrodes, respectively. Electrodes 21 of battery modules 11 arranged side by side are connected to each other by a bus bar 81. Bus bar 81 is formed of plate-shaped metal.

At an end portion of the thus arranged plurality of battery modules 11, a binding plate 91 is provided. Binding plates 91 apply a force in compressing direction, to the thus arranged plurality of battery modules 11 from opposite end portions. Consequently, battery modules 11 are kept in the arranged state and appropriate pressure is applied to each battery module.

At the opposite end portion of the thus arranged plurality of battery modules 11, a similar binding plate is also provided, though not shown. These two binding plates 91 are coupled by a coupling member, not shown.

Figure 2:
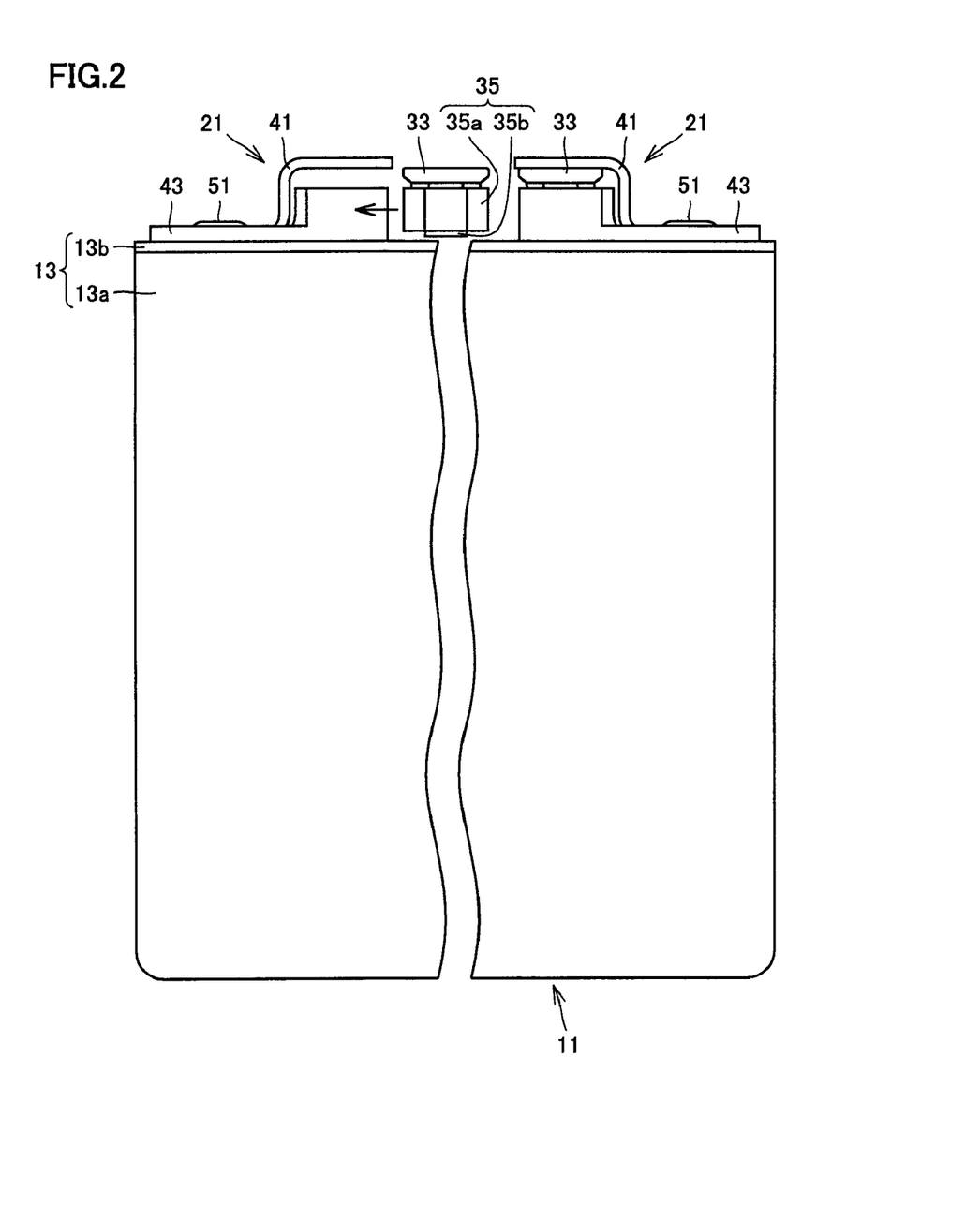
FIG. 2 is a side view showing a structure of a battery module in accordance with Embodiment 1 of the present invention.
Figure 3:
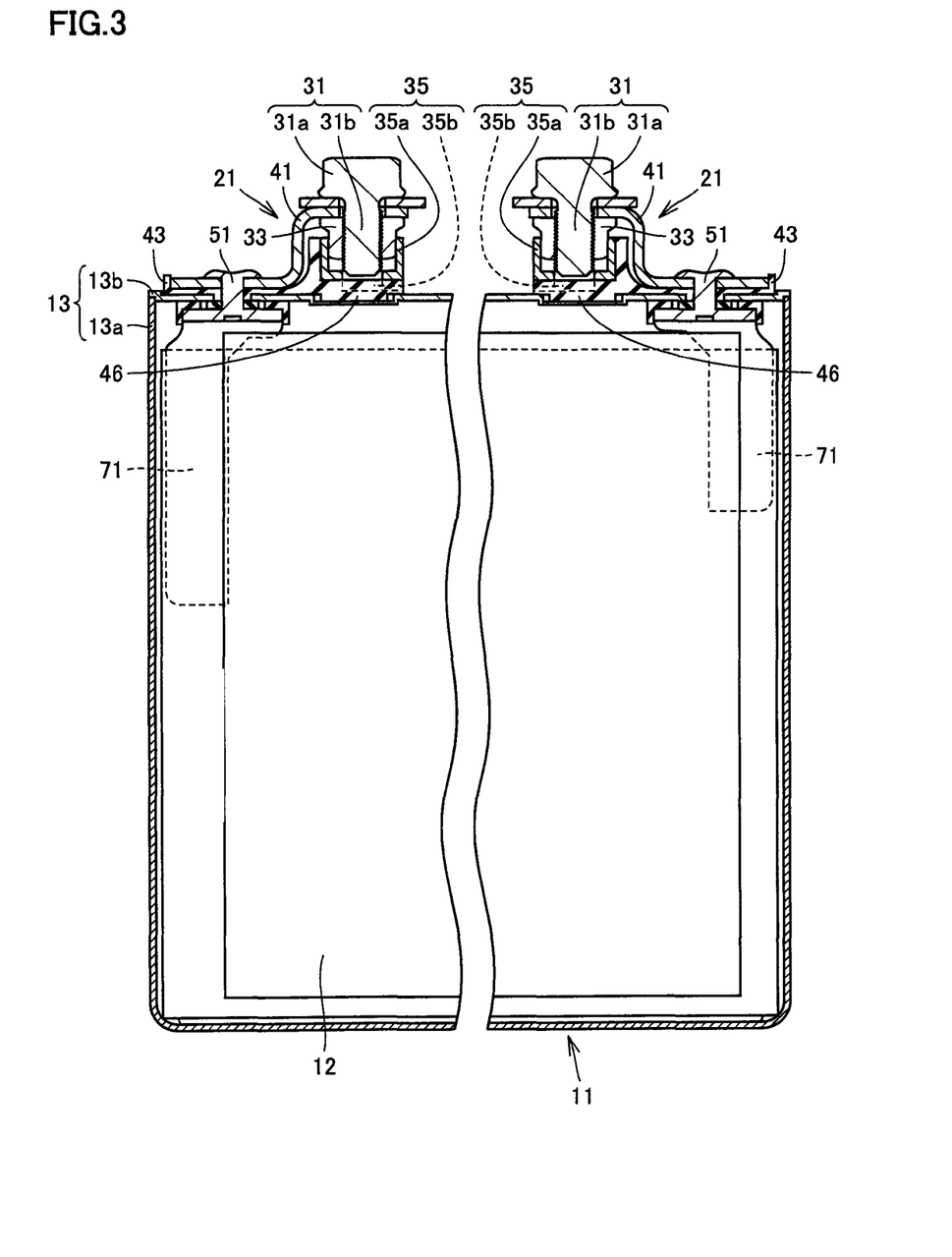
FIG. 3 is a cross-sectional view taken along the line III-III of FIG. 1, showing the structure of the battery module in accordance with Embodiment 1 of the present invention.
Figure 4:
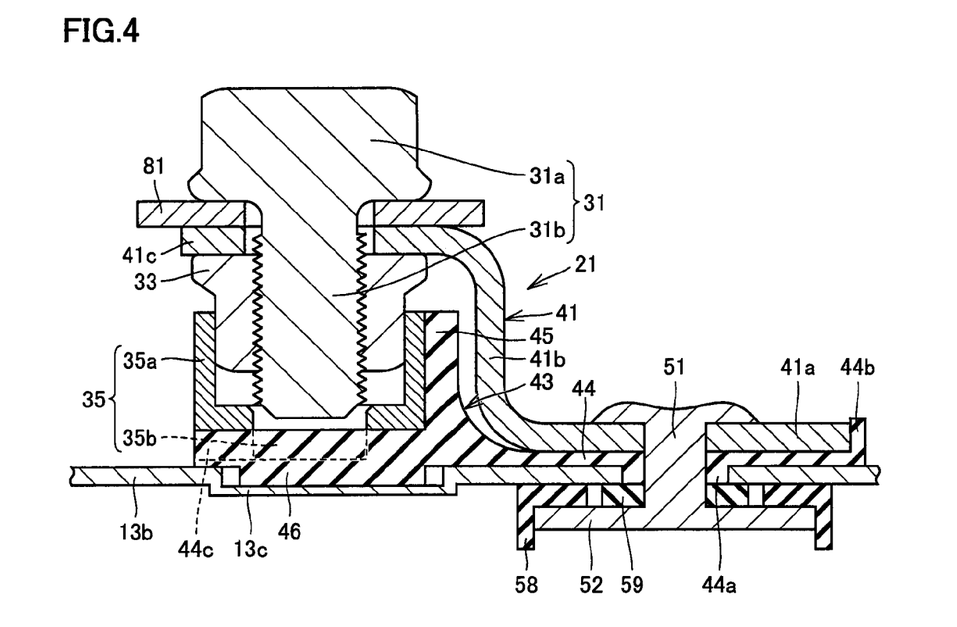
FIG. 4 is a vertical sectional view showing a structure of an electrode in accordance with Embodiment 1 of the present invention.
Figure 5:
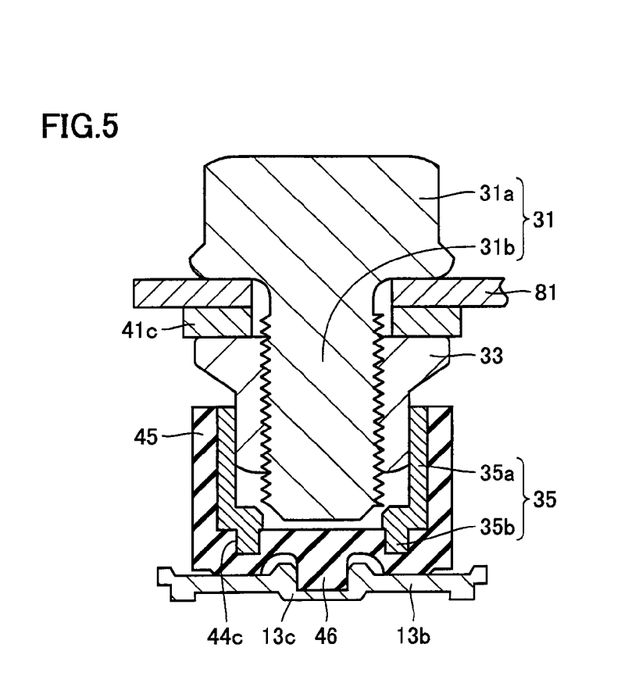
FIG. 5 is a cross-sectional view taken along the line V-V of FIG. 1, showing the structure of the electrode in accordance with Embodiment 1 of the present invention.
Figure 6:
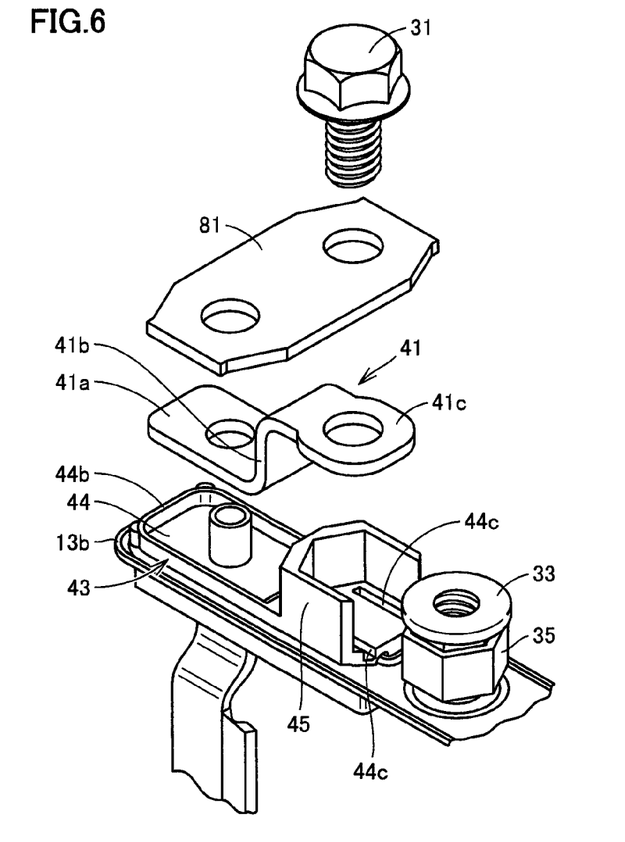
FIG. 6 is an exploded perspective view showing the structure of the electrode in accordance with Embodiment 1 of the present invention.
Figure 7:
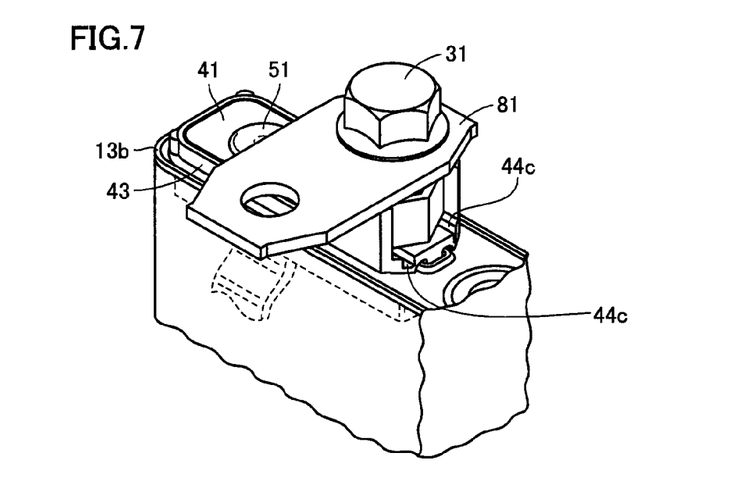
FIG. 7 is a perspective view of an electrode to which a bus bar is fastened, showing the structure of the electrode in accordance with Embodiment 1 of the present invention.

FIG. 2 is a side view of a battery module in accordance with the present embodiment, FIG. 3 is a cross-sectional view taken along the line of FIG. 1, FIG. 4 is a vertical sectional view of an electrode, FIG. 5 is a cross-sectional view taken along the line V-V of FIG. 1, FIG. 6 is an exploded perspective view of an electrode, and FIG. 7 is a perspective view of an electrode to which a bus bar is fastened.

Battery module 11 has a battery cell 12 provided inside. Battery cell 12 is housed in a battery case 13. Battery cell 12 may be any chargeable/dischargeable secondary battery and not specifically limited. By way of example, it may be a nickel-metal hydride battery or a lithium ion battery.

Though FIG. 2 shows an example in which one battery cell 12 is housed in one battery case 13, a plurality of battery cells may be housed. In the present specification, the battery module encompasses one having a plurality of battery cells provided in the battery case and one having one battery cell provided in the battery case. Further, in the present specification, the battery cell means a minimum unit that functions as a chargeable/dischargeable secondary battery.

Battery case 13 includes a battery case body 13a and a lid 13b. In order to provide adequate strength, battery case 13 is formed, for example, of a galvanized sheet steel. Battery case body 13a has a box shape with a space inside and open only at the upper plane. Lid 13b has a plate shape. To lid 13b, a pair of electrodes 21 serving as positive and negative electrodes, respectively, is attached. These electrodes 21 are electrically connected to battery cell 12 housed in battery case 13.

As shown in FIGS. 3 to 5, electrode 21 includes a metal terminal 41 having a base and a tip end, the base fixed to a body of a battery module, the tip end spaced apart by a predetermined distance from the body of the battery module and connected to bus bar 81, a nut 33 arranged between the tip end of metal terminal 41 and the body of the battery module, a rotation stopper in abutment with nut 33 and preventing nut 33 from slipping when fastening bus bar 81, and a screw shaft screwed into nut 33 and penetrating through the tip end of metal terminal 41 and bus bar 81.

Metal terminal 41 has an approximately Z-shape when viewed from the side. Specifically, metal terminal 41 includes a fixing piece 41a to be fixed to lid 13b, a connecting piece 41b bent at a right angle from fixing piece 41a and extending in a direction away from lid 13b, and a terminal piece 41c continuous to connecting piece 41b and parallel to the fixing piece 41a. Fixing piece 41a is formed to be the base of metal terminal 41, while terminal piece 41c is formed to be the tip end of metal terminal 41.

Fixing piece 41a and terminal piece 41c have through holes. A rivet 51 passes through the through hole of fixing piece 41a, and a bolt 31 passes through the through hole of terminal piece 41c. Though connecting piece 41b is bent at a right angle with respect to fixing piece 41a and terminal piece 41c, the angle is not necessarily be a right angle.

Fixing piece 41a and terminal piece 41c are formed approximately in parallel. Metal terminal 41 is formed by bending a metal plate. As terminal piece 41c and fixing piece 41a are connected by connecting piece 41b, terminal piece 41c and fixing piece 41a are off-set. This forms a space for arranging nut 33 between terminal piece 41c and lid 13b. In the present embodiment, the distance between fixing piece 41a and terminal piece 41c is set to provide a space into which nut 33 and a rotation stopper or the like of nut 33 can be inserted.

In the present embodiment, the width of connecting piece 41b is made to be equal to the width of fixing piece 41a. The width of terminal piece 41c is formed to be wider than the width of fixing piece 41a and connecting piece 41b. This can ensure enough radial width around the through hole through which bolt 31 passes.

As shown in FIGS. 4 and 5, bus bar 81 and terminal piece 41c of metal terminal 41 are fastened together by bolt 31 and nut 33. Bolt 31 includes a hexagonal bolt head 31a and a rod-shaped screw shaft 31b which passes through the through holes of bus bar 81 and terminal piece 41c.

For nut 33, the present embodiment uses a flange nut, which has a surface in abutment with terminal piece 41c and wider spread than a body portion. Use of a flange nut increases the contact area with terminal piece 41c, and therefore, terminal piece 41c and bus bar 81 can be stably fixed. Nevertheless, the nut is not limited to those having a flange.

Nut 33 is provided with an engaging member 35 for engagement with an outer periphery of nut 33. Engaging member 35 has, when viewed from the top, a hexagonal shape extending along the hexagonal outer periphery of nut 33. Engaging member 35 includes a hollow column portion 35a which is formed in a hexagonal hollow column shape with a bottom, and a key portion 35b which is provided at the bottom of hollow column 35a. Key portion 35b is rib-shaped protrusion protruding from the lower surface of hollow column 35a and extending in one direction. A pair of key portions 35b is provided. A pair of key portions 35b, 35b are provided to be spaced from each other and parallel to each other.

An outer peripheral surface of nut 33 is in contact with an inner surface of hollow column 35a, which prevents nut 33 from rotating relative to engaging member 35. At the bottom of hollow column 35a, a through hole is provided through which a tip end of bolt 31 can be inserted. Engaging member 35 can be manufactured, for example without limitation, by molding a synthetic resin.

Between fixing piece 41a of metal terminal 41 and lid 13b, an insulator 43 is provided. Insulator 43 insulates metal terminal 41 from lid 13b, and functions as a gasket sealing the through hole of lid 13b.

Insulator 43 includes a base plate portion 44 extending along an upper surface of lid 13b, and a wall portion 45 protruding upward from base plate portion 44 and laterally enclosing nut 33. Insulator 43 may be formed of any insulating material and, by way of example, it is formed of synthetic resin. Here, polyphenylene sulfide (PPS) resin or nylon is used.

On the lower surface of base plate portion 44 of insulator 43, a ring-shaped protrusion 44a is provided, which is inserted into the through hole of lid 13b. On the upper surface of base plate portion 44, fixing piece 41a of metal terminal 41 is arranged. At an outer periphery of base plate portion 44, a peripheral wall 44b is formed, surrounding an outer periphery of fixing piece 41a of metal terminal 41. As fixing piece 41a is surrounded by peripheral wall 44b, more reliable insulation between metal terminal 41 and lid 13b is realized.

Base plate portion 44 of insulator 43 extends to below terminal piece 41c. At a position corresponding to below terminal piece 41c of base plate portion 44, a protrusion 46 protruding downward is provided. Protrusion 46 is positioned inside a recessed portion 13c of lid 13b.

Protrusion 46 and recessed portion 13c extend in the direction in which insulator extends. Protrusion 46 is positioned inside lid 13b, thereby preventing insulator 43 from pivoting around rivet 51.

Wall portion 45 is open in one direction so as to allow engaging member 35 and nut 33 to be inserted from a lateral direction. An inner wall of wall portion 45 is shaped to extend along four surfaces of a hexagonal column such that the inner wall of wall portion 45 extends along an outer surface of engaging member 35.

Base plate portion 44 has a segment enclosed by wall portion 45, and this segment is provided with a pair of slotted portions 44c. Into slotted portions 44c, key portions 35b of engaging member 35 are inserted. Slotted portion 44c has an open end so that key portion 35b can be inserted from a lateral direction, as shown in FIGS. 6 and 7.

At a lower end of rivet 51, a seat 52 of a rectangular metal plate is provided. To seat 52, a terminal 71 extending downward is connected as shown in FIG. 3, and terminal 71 is electrically connected to battery cell 12.

Between the upper surface of seat 52 and lid 13b, an insulating member 58 is arranged. An outer peripheral portion of insulating member 58 is suspended downward, surrounding an outer periphery of seat 52. For insulating member 58, a resin material or the like hard to degrade in an environment in battery case 13 should be used. Here, PPS resin is used.

A ring-shaped gasket 59 is provided to be in tight-contact with an outer circumference of a shaft of rivet 51. Gasket 59 is positioned inside the through hole of insulating member 58, and an upper surface of gasket 59 is in contact with the circumference of the through hole in lid 13b. This realizes more reliable tight-sealing of battery case 13. For the gasket, a material such as a resin or rubber may be used.

Now, manufacturing steps of battery module 11 having electrodes 21 will be explained. First, metal terminal 41, insulator 43 and lid 13b are overlaid on each other, and penetrated through by the tip end of rivet 51 penetrating through gasket 59 and insulating member 58. In this state, the tip end of rivet 51 is swaged and enlarged, and insulator 43 and metal terminal 41 are fixed to lid 13b. Taking the process step of swaging rivet 51 into account, it is necessary to attach metal terminal 41 to lid 13b prior to fixing of lid 13b on battery case body 13a.

Terminal 71 electrically connected to rivet 51 is then connected to battery cell 12. In this state, battery cell 12 is inserted into battery case body 13a, battery case body 13a and lid 13b are fixed, and battery case 13 is sealed.

Engaging member 35 is attached to nut 33, and nut 33 and engaging member 35 are inserted between terminal piece 41c and base plate portion 44 from a lateral direction. Terminal piece 41c of metal terminal 41 is off-set from lid 13b, so that a space for inserting nut 33 and engaging member 35 between terminal piece 41c and lid 13b is provided.

At this time, key portions 35b of engaging member 35 and slotted portions 44c of base plate portion 44 are engaged together. Since slotted portion 44c has an open end, it is possible to insert key portion 35b thereinto from a lateral direction. The engagement of key portions 35b of engaging member 35 and slotted portions 44c of base plate portion 44 and the enclosure of engaging member 35 by wall portion 45 prevent engaging member 35 and nut 33 from dropping. This facilitates transport to the next process step.

When bus bar 81 is fastened, bus bar 81 is arranged at a predetermined position of terminal piece 41c, and they are penetrated through by bolt 31 from above. Bolt 31 is screwed and fastened into nut 33 so that bus bar 81 and terminal piece 41c can be fixed. In the process step of fastening bolt 31 to nut 33, the engagement of nut 33 and engaging member 35 and the engagement of key portions 35b of engaging member 35 and slotted portions 44c of base plate portions 44 prevent co-rotation of nut 33. Bolt 31 can be fastened to nut 33 without the necessity of holding nut 33, for example, with a tool.

It should be noted that in order to more effectively prevent co-rotation of nut 33, friction stabilizing agent may be applied to increase coefficient of friction between metal terminal 41 and nut 33.

In the present embodiment, it is only metal terminal 41 that is attached to lid 13b in the process steps prior to fixing of lid 13b and battery case body 13a, i.e., prior to sealing of battery case 13. In contrast with the electrode structure as shown in FIG. 11, no bolt is fixed in advance to metal terminal 41. Minimization of metal parts to be attached to lid 13b prior to sealing of battery case 13 with lid 13b and battery case body 13a is achieved, and therefore, the possibility of intrusion of metal power generated by friction between metal members into battery case 13 can be minimized. As a result, it is possible to skip or shorten a cleaning step of lid 13b and electrode 21 prior to attachment of lid 13b.

Such process steps are realized by virtue of the adoption of a structure of electrode 21 which allows nut 33 to be attached after sealing of lid 13b. In electrode 21 of the present embodiment, with metal terminal 41 fixed to lid 13b by means of rivet 51, nut 33 to which engaging member 35 is attached can be inserted from a lateral direction without interference from metal terminal 41 and lid 13b.

Since nut 33 is held by engaging member 35 and insulator 43, nut 33 can be kept held between the completion of battery module 11 and the next process step. Further, co-rotation of nut 33 is prevented by engaging member 35 and base plate portion 44 of insulator 43, facilitating fastening of bolt 31 and nut 33 together.

In the present embodiment, metal terminal 41 is formed to include fixing piece 41a fixed to lid 13b, connecting piece 41b bent at a right angle from fixing piece 41a and extending in a direction away from lid 13b, and terminal piece 41c continuous to connecting piece 41b and parallel to the fixing piece 41a. Bolt 31 is inserted to terminal piece 41c, and a nut 39 is fastened to bolt 31 to fix bus bar 81. In the present embodiment, fixing piece 41a and terminal piece 41c are off-set and connected by connecting piece 41b and, therefore, in this step of fastening nut 39, moment exerted on terminal piece 41c is absorbed by deformation of connecting piece 41b and not much transmitted to fixing piece 41a. Fixing piece 41a is fixed to lid 13b by rivet 51, and undesirable influence on this fixing structure can be minimized.

Effects attained by adopting metal terminal 41 of such a shape will be described in greater detail. To begin with, in a battery module, the fixing portion of electrode 21 to the body of battery module is a very important portion in order to ensure the following functions. First, rivet 51 used for fixing functions as an electrical conduction member between metal terminal 41 and battery cell 12. Second, insulator 43 fixed simultaneously by crimping of rivet 51 ensures insulation of battery case 13 from electrode 21 and rivet 51. Third, insulator 43 fixed by rivet 51 also functions to ensure tight-sealing at the fixing portion. In order to reliably attain these functions, it is preferred that as small stress as possible is transmitted through metal terminal 41 to rivet 51 and insulator 43 positioned at the fixing portion.

Such being the case, if the electrode were formed of a flat metal plate, the stress of fastening the nut would be directly transmitted through the electrode to the fixing portion. In that case, if a high stress were applied to the rivet, for example, the rivet would possibly be loosened, or the insulator would possibly be deformed. This possibly leads to a failure of electrical conduction at the rivet, or insufficient insulation or insufficient tight-sealing by the insulator.

In contrast, according to the present embodiment, since fixing piece 41a and terminal piece 41c are connected by connecting piece 41b and thereby fixing piece 41a and terminal piece 41c are off-set, even when a high stress is applied to terminal piece 41c, connecting piece 41b deforms and alleviates the stress applied to the fixing portion. As a result, possibility of the above-described problems can be reduced.

In the present embodiment, engaging member 35 is provided with key portion 35b and base plate portion 44 is provided with slotted portion 44c. Conversely, engaging member 35 may be provided with a slotted portion and base plate portion 44 may be provided with key portion 35b to be engaged with the slotted portion. Further, key portions may be formed of a plurality of protrusions divided in the direction in which the key portions extend. Furthermore, each of engaging member 35 and base plate portion 44 may be provided with a slotted portion into which a key is inserted in such a manner as to extend across both slotted portions.

Embodiment 2

Figure 8:
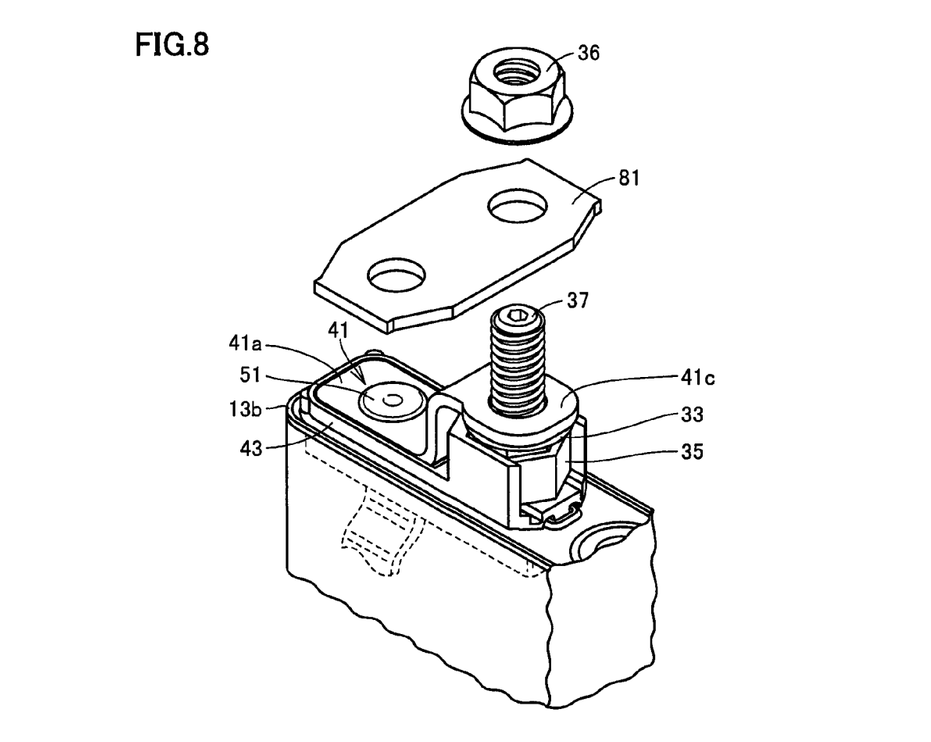
FIG. 8 is an exploded perspective view showing a structure of an electrode in accordance with Embodiment 2 of the present invention.
Figure 9:
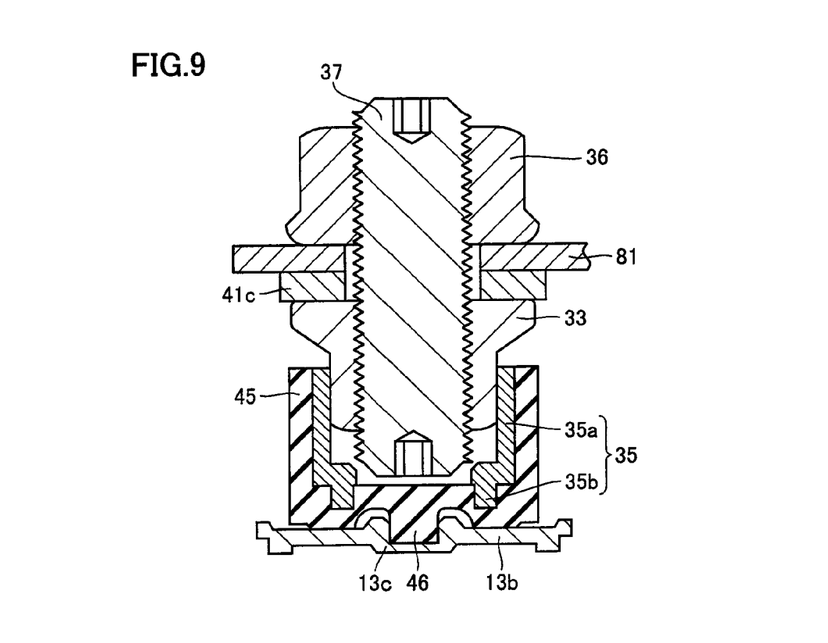
FIG. 9 is a vertical sectional view showing the structure of the electrode in accordance with Embodiment 2 of the present invention.

Next, Embodiment 2 will be described with reference to FIGS. 8 and 9. FIG. 8 is an exploded perspective view showing a structure of an electrode of the present embodiment, and FIG. 9 is a vertical sectional view showing a structure of the same electrode.

In the above-described embodiment, screw shaft 31b is formed of a shaft of a headed bolt, whereas in the present embodiment, screw shaft 31b is formed of a headless setscrew 37. A headless setscrew is a screw which has no screw head in contrast with a headed bolt used in the above-described embodiment and has opposing ends formed of a screw shaft itself. To tighten a headless setscrew, headless setscrew 37 of the present embodiment has an end face provided with a hexagonal hole.

The headless setscrew used in the present embodiment can be any headless setscrew as long as it does not have an end provided with a bolt head which cannot pass through a threaded hole of a fixing nut 36. The headless setscrew is not limited to those illustrated in FIGS. 8 and 9. For instance, headless setscrew 37 in which only a tip end thereof is free of a thread groove may be used. Headless setscrew 37 may also be used in which a tip end is provided with a hexagonal column portion smaller than the threaded hole of fixing nut 36 in diameter. As to this headless setscrew, the hexagonal column portion can be held with a tool so as to tighten headless setscrew 37.

Headless setscrew 37 has a lower end screwed into nut 33, penetrates through terminal piece 41c of metal terminal 41 and bus bar 81, and screws into fixing nut 36. The rest of the structure is the same as in Embodiment 1.

In the present embodiment, lid 13b and battery case body 13a are sealed together, followed by, as in the above-described embodiment, attachment of nut 33 to which engaging member 35 is attached. Headless setscrew 37 is then screwed into nut 33. An upper end of headless setscrew 37 protrudes upward from terminal piece 41c.

In this state, bus bar 81 is passed through the upper end of headless setscrew 37, and headless setscrew 37 and fixing nut 36 are screwed and fastened together. In the present embodiment, use of headless setscrew 37 allows the upper end of headless setscrew 37 to protrude as shown in FIG. 8. This allows, when attaching bus bar 81, bus bar 81 to be guided by the protruding upper end of headless setscrew 37, facilitating attachment of bus bar 81.

Embodiment 3

Figure 10:
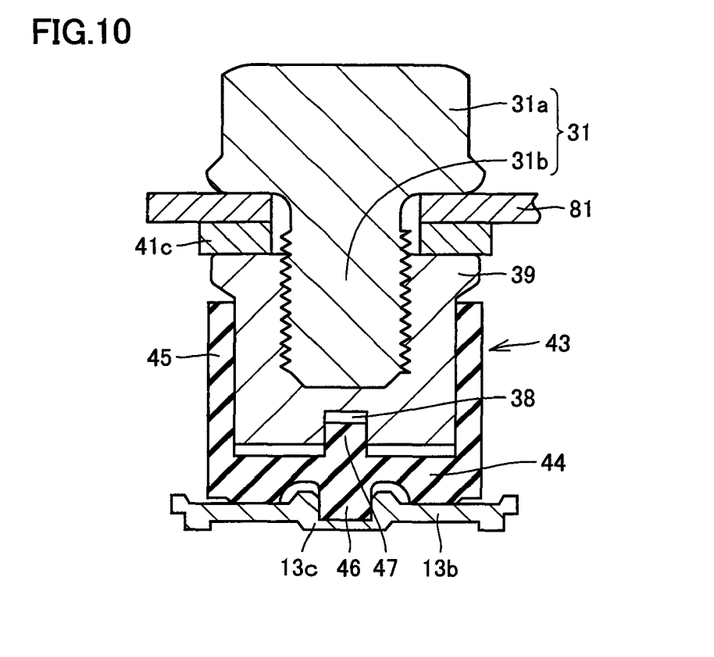
FIG. 10 is a vertical sectional view showing a structure of an electrode in accordance with Embodiment 3 of the present invention.

Next, Embodiment 3 will be described with reference to FIG. 10. FIG. 10 is a vertical sectional view showing a structure of an electrode of the present embodiment.

The structure of electrode 21 of the present embodiment differs from Embodiment 1 in the structure of a rotation stopper of a nut. In nut 39 of the present embodiment, the bottom of the nut is provided with a slotted portion 38 extending in the direction of insertion of nut 39. In addition, base plate portion 44 of insulator 43 is provided with a key portion 47 protruding upward.

Slotted portion 38 of nut 39 is in engagement with key portion 47 of base plate portion 44. Slotted portion 38 of nut 39 has an end opening in a lateral direction. This allows nut 39 to be inserted from a lateral direction in a process step subsequent to fixing of metal terminal 41 on lid 13*b*, in the same manner as nut 33 and engaging member 35 of Embodiment 1.

In the present embodiment, nut 39 is provided with slotted portion 38 and base plate portion 44 is provided with key portion 47. Conversely, nut 39 may be provided with a downwardly protruding key portion and base plate portion 44 may be provided with a slotted portion.

According to the present embodiment, the need for an engaging member as used in Embodiment 1 is eliminated, achieving a reduced parts count. The structure of the present embodiment may adopt a structure using the headless setscrew described in Embodiment 2.

It should be noted that embodiments disclosed herein are by way of illustration in all respects and not a basis for a restrictive interpretation. Therefore, the technical scope of the present invention is not construed only by the above-described embodiments, but defined based on the recitation of claims and includes all modifications equivalent in meaning and scope to the claims.

INDUSTRIAL APPLICABILITY

According to the present invention, an electrode structure can be provided in which parts to be attached in advance to a metal terminal of an electrode are reduced so that generation of metal powder can be reduced.

DESCRIPTION OF THE REFERENCE SIGNS

1 battery device, 11 battery module, 12 battery cell, 13 battery case, 13*a* battery case body, 13*b* lid, 13*c* recessed portion, 21 electrode, 31 bolt, 31*a* bolt head, 31*b* screw shaft, 33 nut, 35 engaging member, 35*a* hollow column portion, 35*b* key portion, 36 fixing nut, 37 headless setscrew, 38 slotted portion, 39 nut, 41 metal terminal, 41*a* fixing piece, 41*b* connecting piece, 41*c* terminal piece, 43 insulator, 44 base plate portion, 44*a* protrusion, 44*b* peripheral wall, 44*c* slotted portion, 45 wall portion, 46 protrusion, 47 key portion, 51 rivet, 52 seat, 58 insulating member, 59 gasket, 71 terminal, 81 bus bar, 91 binding plate.

The invention claimed is:

1. An electrode structure for connecting a battery module to a bus bar, comprising:
    a metal terminal having a base and a tip end, the base being fixed to a body of the battery module, the tip end being spaced apart by a predetermined distance from the body of the battery module and connected to the bus bar;
    a nut arranged between the tip end of said metal terminal and said body of the battery module;
    a screw shaft screwed into the nut and penetrating through the tip end of said metal terminal and the bus bar;
    an insulator arranged between the base of said metal terminal and the body of the battery module; and
    an engaging member in engagement with a periphery of said nut, wherein
    said engaging member has one of a key and a slot extending in a direction of insertion of the nut between the tip end of said metal terminal and said insulator,
    said insulator has the other of a key and a slot to be engaged with the key or slot of said engaging member, and
    said insulator and said engaging member in engagement with said nut are engaged together by said key and slot to form a rotation stopper preventing said nut from slipping when fastening the bus bar.

2. The electrode structure according to claim 1, wherein said insulator has a wall portion rising up to laterally enclose said nut.

3. The electrode structure according to claim 1, wherein said screw shaft is formed of a bolt in which a bolt head and a screw shaft portion are integrally formed.

4. The electrode structure according to claim 1, wherein said screw shaft is formed of a headless setscrew penetrating through the tip end of said metal terminal and the bus bar and screwed into said nut and
    a fixing nut for fastening the tip end of said metal terminal and the bus bar together is screwed into a tip end of said headless setscrew.

5. An electrode structure for connecting a battery module to a bus bar, comprising:
    a metal terminal having a base and a tip end, the base being fixed to a body of the battery module, the tip end being spaced apart by a predetermined distance from the body of the battery module and connected to the bus bar;
    a nut arranged between the tip end of said metal terminal and said body of the battery module;
    a screw shaft screwed into the nut and penetrating through the tip end of said metal terminal and the bus bar; and
    an insulator arranged between the base of said metal terminal and the body of the battery module, wherein
    said nut has one of a key and a slot extending in a direction of insertion of the nut between the tip end of said metal terminal and said insulator,
    said insulator has the other of a key and a slot to be engaged with the key or slot of said nut, and
    said insulator and said nut are engaged together by said key and slot to form a rotation stopper preventing said nut from slipping when fastening the bus bar.

6. The electrode structure according to claim 5, wherein said insulator has a wall portion rising up to laterally enclose said nut.

7. The electrode structure according to claim 5, wherein said screw shaft is formed of a bolt in which a bolt head and a screw shaft portion are integrally formed.

8. The electrode structure according to claim 5, wherein said screw shaft is formed of a headless setscrew penetrating through the tip end of said metal terminal and the bus bar and screwed into said nut, and
    a fixing nut for fastening the tip end of said metal terminal and the bus bar together is screwed into a tip end of said headless setscrew.

9. An electrode structure for connecting a battery module to a bus bar, comprising:
    a metal terminal having a base and a tip end, the base being fixed to a body of the battery module, the tip end being spaced apart by a predetermined distance from the body of the battery module and connected to the bus bar;

a nut arranged between the tip end of said metal terminal and said body of the battery module;

a rotation stopper in abutment with said nut and preventing said nut from slipping when fastening the bus bar; and a screw shaft screwed into the nut and penetrating through the tip end of said metal terminal and the bus bar; and an insulator arranged between the base of said metal terminal and the body of the battery module, wherein said insulator has a wall portion rising up to laterally enclose said nut.

10. The electrode structure according to claim 9, wherein said screw shaft is formed of a bolt in which a bolt head and a screw shaft portion are integrally formed.

11. The electrode structure according to claim 9, wherein said screw shaft is formed of a headless setscrew penetrating through the tip end of said metal terminal and the bus bar and screwed into said nut, and a fixing nut for fastening the tip end of said metal terminal and the bus bar together is screwed into a tip end of said headless setscrew.

* * * * *